United States Patent
Sewiolo (10) Patent No.: US 11,165,310 B2
(45) Date of Patent: Nov. 2, 2021

(54) STATOR FOR A ROTATING ELECTRIC MACHINE HAVING DIELECTRIC REGIONS FOR A WINDING HEAD BOARD

(71) Applicant: Siemens Aktiengesellschaft, Munich (DE)

(72) Inventor: Benjamin Sewiolo, Obermichelbach (DE)

(73) Assignee: Siemens Aktiengesellschaft, Munich (DE)

( * ) Notice: Subject to any disclaimer, the term of this patent is extended or adjusted under 35 U.S.C. 154(b) by 190 days.

(21) Appl. No.: 16/487,378

(22) PCT Filed: Feb. 14, 2018

(86) PCT No.: PCT/EP2018/053661
§ 371 (c)(1),
(2) Date: Aug. 20, 2019

(87) PCT Pub. No.: WO2018/153745
PCT Pub. Date: Aug. 30, 2018

(65) Prior Publication Data
US 2019/0372433 A1    Dec. 5, 2019

(30) Foreign Application Priority Data

Feb. 21, 2017   (EP) .................................... 17157172

(51) Int. Cl.
*H02K 9/22*     (2006.01)
*B33Y 80/00*    (2015.01)
(Continued)

(52) U.S. Cl.
CPC ................ *H02K 9/22* (2013.01); *B33Y 80/00* (2014.12); *H02K 3/30* (2013.01); *H02K 3/38* (2013.01); *H02K 3/50* (2013.01); *H02K 2203/03* (2013.01)

(58) Field of Classification Search
CPC .. H02K 3/30; H02K 3/38; H02K 3/50; H02K 9/22; H02K 11/00; H02K 11/0094; H02K 11/30; H02K 2203/03
(Continued)

(56) References Cited

U.S. PATENT DOCUMENTS

| 5,623,178 A | 4/1997 | Kawabata et al. |
| 5,783,888 A | 7/1998 | Yamano |

(Continued)

FOREIGN PATENT DOCUMENTS

| CN | 1115918 A | 1/1996 |
| CN | 102906972 A | 1/2013 |

(Continued)

OTHER PUBLICATIONS

"PCT International Search Report and Written Opinion of International Searching Authority dated Aug. 2, 2018 corresponding to PCT International Application No. PCT/EP2018/053661 filed Feb. 14, 2018".

*Primary Examiner* — Tulsidas C Patel
*Assistant Examiner* — Rashad H Johnson
(74) *Attorney, Agent, or Firm* — Henry M. Feiereisen LLC (57) ABSTRACT

A stator for an electrical rotating machine includes a laminated core having coil bars and a winding head board resting on an end side of the laminated core and having a main body including a first dielectric material. Conductor tracks are connected to the coil bars and integrated into the winding head board. The winding head board has a region with a second dielectric material and/or a region with a third dielectric material, with the second dielectric material having a higher thermal conductivity than the first dielectric material. The region with the second dielectric material is arranged between a conductor track and the laminated core (Continued)

such that heat is transmittable between conductor track and laminated core via the second dielectric material. The third dielectric material has a higher dielectric strength than the first dielectric material, with the region with the third dielectric material arranged between at least two conductor tracks.

16 Claims, 6 Drawing Sheets

(51) Int. Cl.
*H02K 3/30* (2006.01)
*H02K 3/38* (2006.01)
*H02K 3/50* (2006.01)

(58) Field of Classification Search
USPC ...................................... 310/64, 71
See application file for complete search history.

(56) References Cited

U.S. PATENT DOCUMENTS

| | | | |
|---|---|---|---|
| 2006/0202584 A1* | 9/2006 | Jore | H02K 3/28 310/179 |
| 2006/0232143 A1 | 10/2006 | Purvines et al. | |
| 2009/0256431 A1 | 10/2009 | Stiesdal | |
| 2009/0312477 A1* | 12/2009 | Nishi | H01L 23/295 524/444 |
| 2010/0038988 A1* | 2/2010 | Ramy | H02K 3/522 310/198 |
| 2010/0301685 A1* | 12/2010 | Grundl | H02K 3/12 310/12.21 |
| 2013/0209239 A1 | 8/2013 | Karlsson | |
| 2014/0319960 A1 | 10/2014 | Iki | |
| 2015/0295478 A1* | 10/2015 | Creviston | H02K 5/225 310/68 D |
| 2015/0318751 A1* | 11/2015 | Smith | H02K 21/24 310/71 |
| 2015/0338143 A1* | 11/2015 | Sakai | F04C 18/0223 417/415 |
| 2016/0301275 A1* | 10/2016 | Head | H02K 3/345 |

FOREIGN PATENT DOCUMENTS

| | | |
|---|---|---|
| CN | 105186721 A | 12/2015 |
| CN | 205725223 U | 11/2016 |
| CN | 108352752 A | 7/2018 |
| DE | 19914942 A1 | 10/2000 |
| DE | 19943446 A1 | 3/2001 |
| DE | 102009032882 B3 | 11/2010 |
| DE | 102014207621 A1 | 10/2014 |
| EP | 0874444 A1 | 10/1998 |
| EP | 1742330 B1 | 9/2009 |
| EP | 2621062 A1 | 7/2013 |
| JP | H0670508 A | 3/1994 |
| JP | H10290543 A | 10/1998 |
| JP | 2004166414 A | 6/2004 |
| RU | 2294588 C2 | 2/2007 |
| SU | 132307 A1 | 11/1980 |

* cited by examiner

STATOR FOR A ROTATING ELECTRIC MACHINE HAVING DIELECTRIC REGIONS FOR A WINDING HEAD BOARD

CROSS-REFERENCES TO RELATED APPLICATIONS

This application is the U.S. National Stage of International Application No. PCT/EP2018/053661, filed Feb. 14, 2018, which designated the United States and has been published as International Publication No. WO 2018/153745 A1 and which claims the priority of European Patent Application, Serial No. 17157172.2, filed Feb. 21, 2017, pursuant to 35 U.S.C. 119(a)-(d).

BACKGROUND OF THE INVENTION

The invention relates to a stator for an electrical rotating machine.

Furthermore, the invention relates to an electrical rotating machine comprising at least one stator of this kind.

A stator of this kind is preferably found in an electrical rotating machine, in particular in a motor or generator, which has a power consumption of at least 1 megawatt.

The stator windings of an electrical rotating machine of this kind are usually embodied as form-wound coils, which are also called bar-type coils. Form-wound coils are produced, for example, by means of casting or powder metallurgy. A winding head, which is created by bending and offsetting the conductors of the form-wound coils, is located at the ends of the form-wound coils. This winding head requires a considerable amount of axial installation space. Resistive losses, which reduce the degree of efficiency of the electrical rotating machine, are created by the additional inactive conductor length of the winding head. Furthermore, it is necessary to cool the winding heads. Further installation space is required for cooling purposes.

Particularly in the case of rapid machines which have a low number of poles, the bearing distance which is increased by the winding heads has a disadvantageous effect on the rotor dynamics. Additional complicated reinforcement measures are also required, on account of the large conductor lengths, in order to prevent impermissible vibrations and deformations during operation. Furthermore, the overall length and the weight of the electrical rotating machine increase. Particularly in the case of a modular design of large machines, in which a plurality of component machines form an overall machine in the axial direction, considerable lengths which are not of electrical use are created on account of the winding heads.

Patent specification DE 10 2009 032 882 B3 describes a method for producing a form-wound coil for a tiered winding of a dynamo-electric machine and also describes a form-wound coil which is produced by means of said method. In order to simplify the production of the form-wound coil, said form-wound coil is produced from a basic coil, wherein the basic coil has two longitudinal sides which are intended to be inserted into slots of a stator or of a rotor of the dynamo-electric machine. The basic coil has two winding head sides which are intended to form a respective winding head of the form-wound coil, wherein the longitudinal skies are bent through 90° in such a way as to insert the longitudinal skies into the slots and to offset the winding head sides from the longitudinal sides.

Laid-open specification DE 199 14 942 A1 describes a method for producing a stator winding for an electrical machine and to a stator winding of this kind. The machine has salient poles. Coil conductors protrude, by way of their ends, beyond the stator laminated core in the axial direction and are fastened in terminals of assemblies. Conductor tracks, which form the turns with the conductors or run from terminals to external connection points, are located on the assemblies.

Patent specification EP 1 742 330 B1 describes a stator winding head for a stator part of a turbogenerator. The stator winding head is formed in the form of a disk with a central cutout for a rotor to pass through, wherein the disk has an insulating main body into which an electrical connection for making contact with a stator conductor is integrated. The contact-connection is established in the form of a plug-in connection and/or with plated-through holes.

Laid-open specification DE 10 2014 207 621 A1 discloses a stator of an electrical rotating machine, which stator contains a stator core having a plurality of slots, a segmented winding having a plurality of phases, and also a plurality of base plates which are layered on each end of the stator core in the axial direction. The stator core and a plurality of winding bars of the segmented winding form a stator core arrangement. The plurality of base plates and the plurality of winding end connectors of the segmented winding form a plurality of base plate arrangements. The stator is configured by the stator core arrangement and the plurality of base plate arrangements which are layered on each end of the stator core arrangement.

The invention is based on the object of providing a stator for an electrical rotating machine, which stator has a smaller axial length in comparison to the prior art.

SUMMARY OF THE INVENTION

According to the invention, this object is achieved by a stator for an electrical rotating machine, which stator has a stator laminated core with coil bars and has at least one winding head board, wherein the at least one winding head board rests on an end side of the stator laminated core, wherein the winding head board has a main body comprising a first dielectric material, wherein conductor tracks which are connected to the coil bars are integrated into the winding head board, wherein the winding head board has a region comprising a second dielectric material and/or a region comprising a third dielectric material, wherein the second dielectric material has a higher thermal conductivity than the first dielectric material of the main body, wherein the region comprising the second dielectric material is arranged between at least one conductor track and the stator laminated core in such a way that heat can be transmitted between the at least one conductor track and the stator laminated core by means of the second dielectric material, wherein the third dielectric material has a higher dielectric strength than the first dielectric material, wherein the region comprising the third dielectric material is arranged between at least two conductor tracks.

According to the invention, the object is furthermore achieved by an electrical rotating machine comprising at least one stator of this kind.

The advantages and preferred refinements cited below with respect to the stator can be transferred analogously to the electrical rotating machine.

The invention is based on the idea of reducing the axial length of an electrical rotating machine owing to a winding head board which is as compact as possible. A significant portion of the installation space for a winding head board is taken up by, for example, cooling ducts which are arranged in the winding head board and through which a coolant, for example a cooling fluid, runs for the purpose of removing heat from the conductor tracks of the winding head board through which current flows. Cooling ducts of this kind are required particularly when the thermal conductivity of the first dielectric material of the main body is insufficient for dissipating the heat from the conductor tracks through which current flows. Furthermore, minimum distances have to be kept between the conductor tracks in particular, so that flashovers do not occur between the conductor tracks, wherein the minimum distances depend on the material properties of the dielectric used. In order to render possible as compact a design of the winding head board as possible, for example with distances between the conductor tracks which are as small as possible and with at least few cooling ducts, the invention proposes using various dielectric materials for the winding head board which differ in respect of their thermal conductivity and dielectric strength. The space requirement for the winding head board is considerably reduced owing to the use of specialized materials and the targeted arrangement of these materials.

In this case, the second dielectric material has a higher thermal conductivity than the first dielectric material of the main body, wherein the region comprising the second dielectric material is arranged between at least one conductor track and the stator laminated core in such a way that heat can be transmitted between the at least one conductor track and the stator laminated core by means of the second dielectric material. By way of example, the second dielectric material contains aluminum nitride and/or beryllium oxide. Owing to an arrangement of a region comprising a second dielectric material which is optimized in respect of a high thermal conductivity, cooling ducts in the winding head board can be at least partially dispensed with, as a result of which the space requirement for the winding head board is reduced, in particular in the axial direction.

Furthermore, the third dielectric material has a higher dielectric strength than the first dielectric material, wherein the region comprising the third dielectric material is arranged between at least two conductor tracks. Owing to the increased dielectric strength, in particular in the region between at least two adjacent conductor tracks, it is possible to reduce the distance between the conductor tracks and to reduce the space requirement for the winding head board.

In a preferred refinement, the at least one winding head board is produced at least partially using an additive manufacturing process. Additive manufacturing processes are, for example, 3D printing and screen printing. By way of example, at least one of the dielectric materials is arranged by means of a 3D printing process or a screen printing process, while the conductor tracks are cast in a subsequent step, for example using a diecasting process. An additive manufacturing process allows complex and compact structures to be realized, this leading to a reduction in the size of the winding head board.

At least one of the dielectric materials is preferably in the form of a ceramic material. A ceramic material includes ceramics and composite materials which comprise at least one component of at least one ceramic, for example a ceramic powder. Ceramic materials of this kind have, for example, good insulation properties, high mechanical strength and/or good thermal conductivity. The use of at least one ceramic material allows a compact winding head board to be realized.

In a further advantageous embodiment, the second dielectric material and/or the third dielectric material contain aluminum nitride and/or beryllium oxide. The thermal conductivity of aluminum nitride lies in a range of from 180 to 220 W/mK; the thermal conductivity of beryllium oxide lies at from 200 to 250 W/mK. Therefore, owing to their high thermal conductivity, aluminum nitride and beryllium oxide are very highly suitable for dissipating heat which is created in the conductor tracks through which current flows.

In a further advantageous refinement, the at least one winding head board rests on a machine housing of the electrical rotating machine. The machine housing is produced, for example, from a metal material. As an alternative or in addition, heat which is created in the conductor tracks through which current flows can be dissipated by means of the machine housing, this leading to improved removal of heat from the winding head board.

The second dielectric material preferably has a higher thermal conductivity than the first dielectric material of the main body, wherein the region comprising the second dielectric material is arranged between at least one conductor track and the machine housing in such a way that heat can be transmitted between the at least one conductor track and the machine housing by means of the second dielectric material. Owing to an arrangement of this kind, the heat which is created in the conductor tracks through which current flows can be efficiently dissipated in the direction of the machine housing and/or the stator laminated core. Therefore, cooling ducts in the winding head board at least can be saved, as a result of which the space requirement for the winding head board is reduced, in particular in the axial direction.

The first dielectric material preferably has a higher mechanical strength than the second dielectric material and the third dielectric material. In particular, the first dielectric material of the main body at least partially surrounds the second and the third dielectric material. Owing to the higher mechanical strength, the winding head board is not damaged even in the event of large mechanical loads, for example in the event of vibrations, high rotation speeds or large changes in torque.

In a preferred refinement, at least one of the dielectric materials contains a plastic comprising a ceramic powder. A composite material of this kind has the electrical and/or thermal properties of the ceramic and can be processed in a simple and cost-effective manner, in particular using an additive manufacturing process. In particular, winding head boards with regions comprising various plastics and/or various ceramic powders can be produced in a simple and cost-effective manner.

In a further advantageous embodiment, the winding head board has at least two layers. A layered construction of this kind makes it easier to design, in particular to simulate, the winding head board.

At least two different dielectric materials are preferably arranged in at least one layer of the winding head board. Owing to the use of, in particular, specialized materials and the targeted arrangement of said materials, for example within one layer, the space requirement for the winding head board is considerably reduced.

BRIEF DESCRIPTION OF THE DRAWING

The invention will be described and explained in more detail below with reference to the exemplary embodiments which are illustrated in the figures,
in which.

Identical reference symbols have the same meaning in the various figures.

DETAILED DESCRIPTION OF PREFERRED EMBODIMENTS

Figure 1:
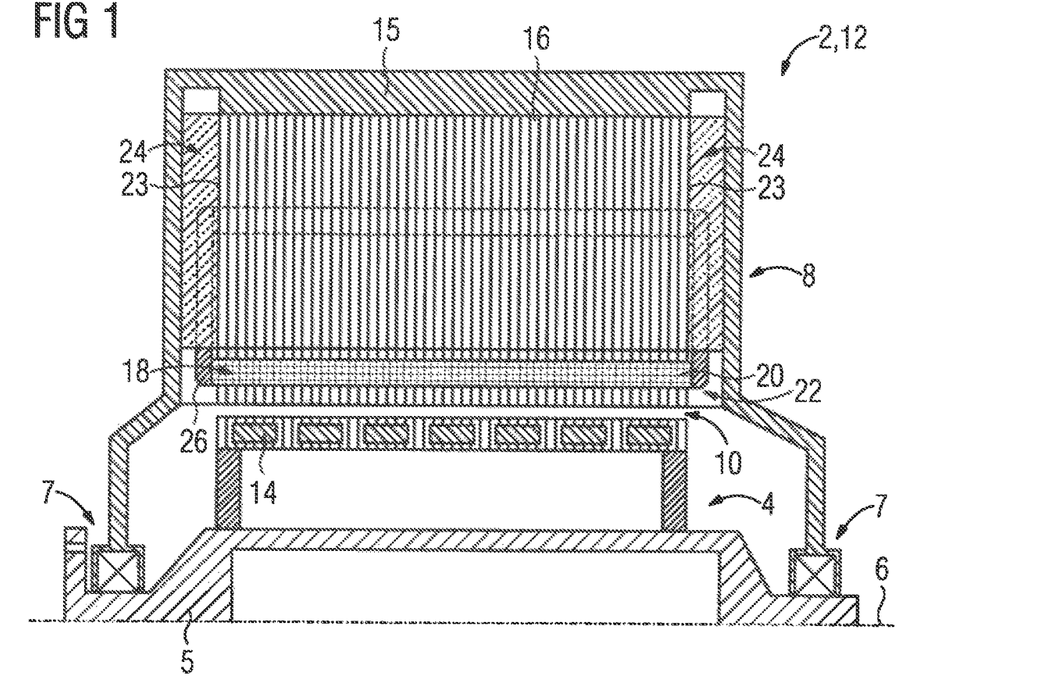
FIG. 1 shows a longitudinal section through an electrical rotating machine.

FIG. 1 shows a longitudinal section through an electrical rotating machine 2 which has a rotor 4 with a shaft 5. The rotor 4 can rotate about a rotation axis 6. The shaft 5 is mounted by means of bearings 7. The electrical rotating machine 2 furthermore has a stator 8 which surrounds the rotor 4. A gap 10, which is embodied as an air gap in particular, is located between the rotor 4 and the stator 8. The rotation axis 6 defines an axial direction and a radial direction.

The electrical rotating machine 2 is embodied, by way of example, as a synchronous machine 12 and has permanent magnets 14 on the rotor 4. The stator 8 comprises a stator laminated core 16 with windings 18, wherein the stator laminated core 16 is constructed from a plurality of layered electrical sheets. The windings 18 have coil bars 20 which run through a respective slot 22 of the stator laminated core 16 in the axial direction.

At least one winding head board 24 rests on each of the two end sides 23 of the stator laminated core 16. In addition, the winding head board 24 rests on a machine housing 15 of the electrical rotating machine 2 and comprises conductor tracks 26 which connect coil bars 20, which run in slots 22, to one another. The conductor tracks 26 and also the coil bars 20 are produced from a metal of high thermal conductivity and high electrical conductivity, for example from copper. Connections of the windings 18 to a terminal box are not illustrated for reasons of clarity.

Figure 2:
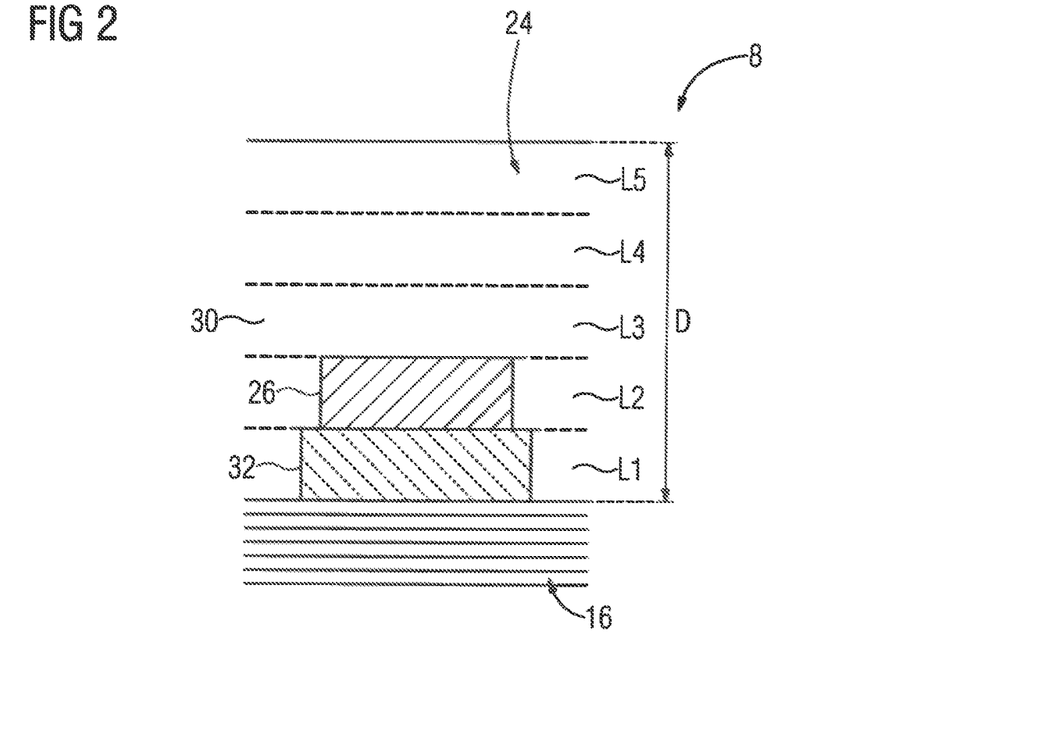
FIG. 2 shows an enlarged longitudinal section through a first embodiment of a stator of an electrical rotating machine in the region of the winding head board.

FIG. 2 shows an enlarged longitudinal section through a first embodiment of a stator 8 of an electrical rotating machine 2 in the region of the winding head board 24 which is constructed, by way of example, from five layers L1, L2, L3, L4, L5. The thickness D of the entire winding head board 24 lies in the centimeter range, in particular in the range of from 3 to 10 cm. The first layer L1 of the winding head board 24 rests on the stator laminated core 15, so that the winding head board 24 is thermally connected to the stator laminated core 16. The topmost, by way of example fifth, layer L5 is optionally thermally connected to a further metal surface, for example a machine housing 15 which is illustrated in FIG. 1, so that the winding head board 24 is additionally thermally connected to the machine housing 15.

A conductor track 26 runs in the second layer L2. The layers L1, L2, L3, L4, L5 of the winding head board 24 are produced for the most part from a first dielectric material 30. In particular, the dielectric material 30 is embodied as a ceramic material, for example aluminum oxide. Aluminum oxide provides a compromise between strength (flexural strength of between 480 and 520 MPa), thermal conductivity (of between 19 and 30 W/mK) and price. In order to improve the thermal connection of the conductor track 26 to the stator laminated core 16, the conductor track 26 in the second layer L2 is thermally connected to the stator laminated core 16 by means of a second dielectric material 32 in the first layer L1. The second dielectric material 32 has a higher thermal conductivity than the first dielectric material 30. In particular, the second dielectric material 32 is in the form of a ceramic material. For example, the second dielectric material 32 contains aluminum nitride (thermal conductivity of between 180 and 220 W/mK) or beryllium oxide (thermal conductivity of between 200 and 250 W/mK). The second dielectric material 32 is embodied, in particular, as a continuous region between the conductor track 26 and the stator laminated core 16. Owing to an improvement in the thermal connection of the conductor track 26 and the associated improved removal of heat, it is possible to at least partially dispense with cooling ducts in the winding head board 24, this leading to a more compact winding head board 24.

The winding head board 24 is at least partially produced using an additive manufacturing process. For example, at least one of the dielectric materials 30, 32, 34 is arranged by means of a 3D printing process or a screen printing process, while the conductor tracks 26 are cast in a subsequent step, for example using a diecasting process.

As an alternative, the conductor tracks 26 are produced using a 3D printing process or a screen printing process. The dielectric materials 30, 32, 34 are then arranged around the conductor tracks 26.

A further possible way of producing the winding head board 24 is by way of both the conductor tracks 26 and also the dielectric materials 30, 32, 34 being produced, preferably at the same time, using a 3D printing process or a screen printing process.

Figure 3:
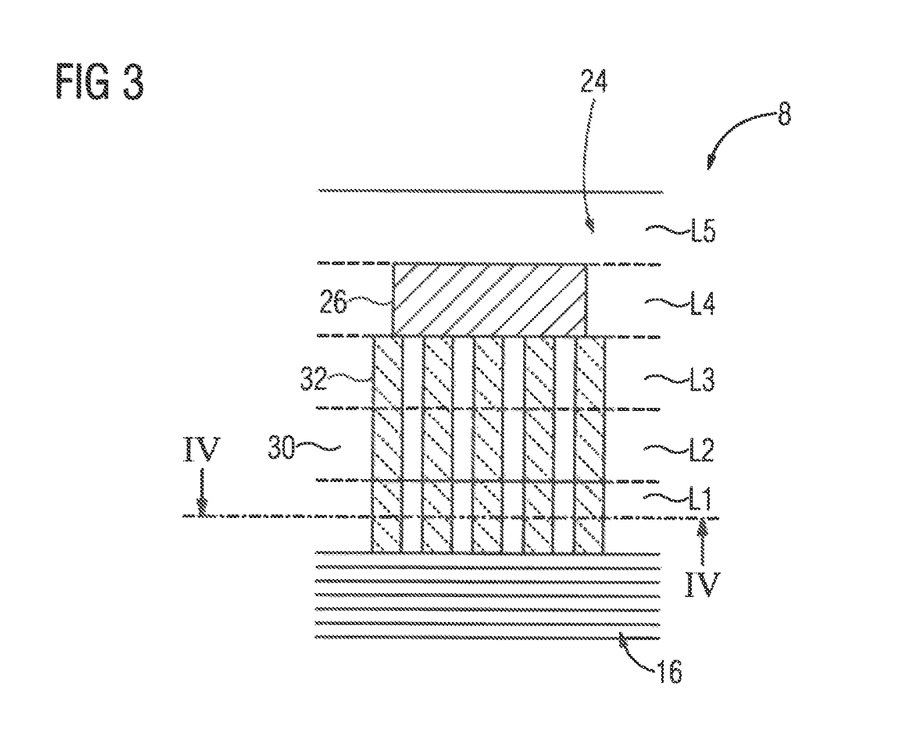
FIG. 3 shows an enlarged longitudinal section through a second exemplary embodiment of a stator of an electrical rotating machine in the region of the winding head board.

FIG. 3 shows an enlarged longitudinal section through a second embodiment of a stator 8 of an electrical rotating machine 2 in the region of the winding head board 24. By way of example, a conductor track 26 is arranged in the fourth layer L4 of the winding head board 24. The region comprising the second dielectric material 32 is structured, in particular in the form of a plurality of, for example identical, pillars, arranged between the conductor track 26 and the stator laminated core 16, and constitutes, owing to the higher thermal conductivity and lower strength of the second dielectric material 32 in comparison to the first dielectric material 30, an optimum balance between thermal connection of the conductor track 26 to the stator laminated core 16 and strength of the winding head board 24. The further design of the stator 8 corresponds to the design in FIG. 2.

Figure 4:
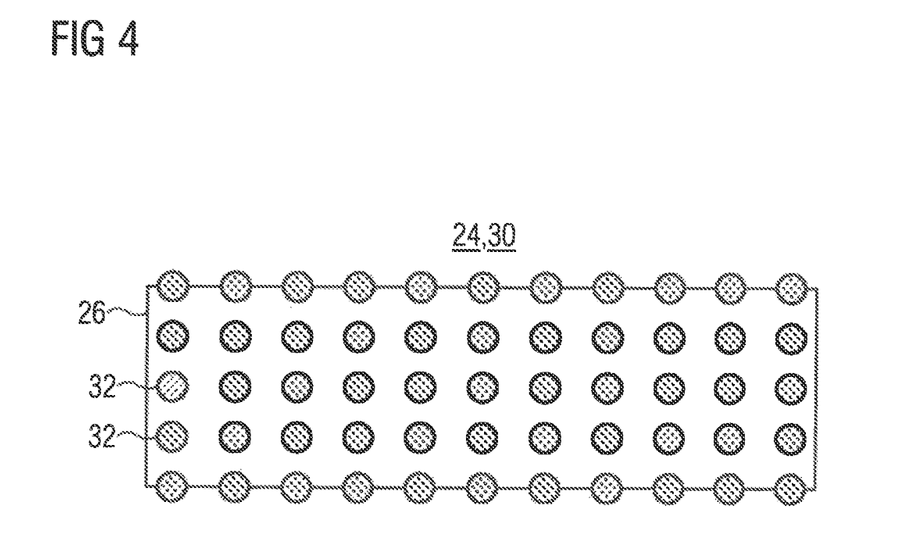
FIG. 4 shows an enlarged cross section through the second embodiment of the stator in the region of the winding head board.

FIG. 4 shows an enlarged cross section through the second embodiment of the stator 8 in the region of the winding head board 24. The structured arrangement of the region comprising the second dielectric material 32 in the winding head board 24 is configured in the form of a large number of, in particular, identical pillars which are uniformly distributed in the region of the conductor track 26. The further design of the stator 8 corresponds to the design in FIG. 3.

Figure 5:
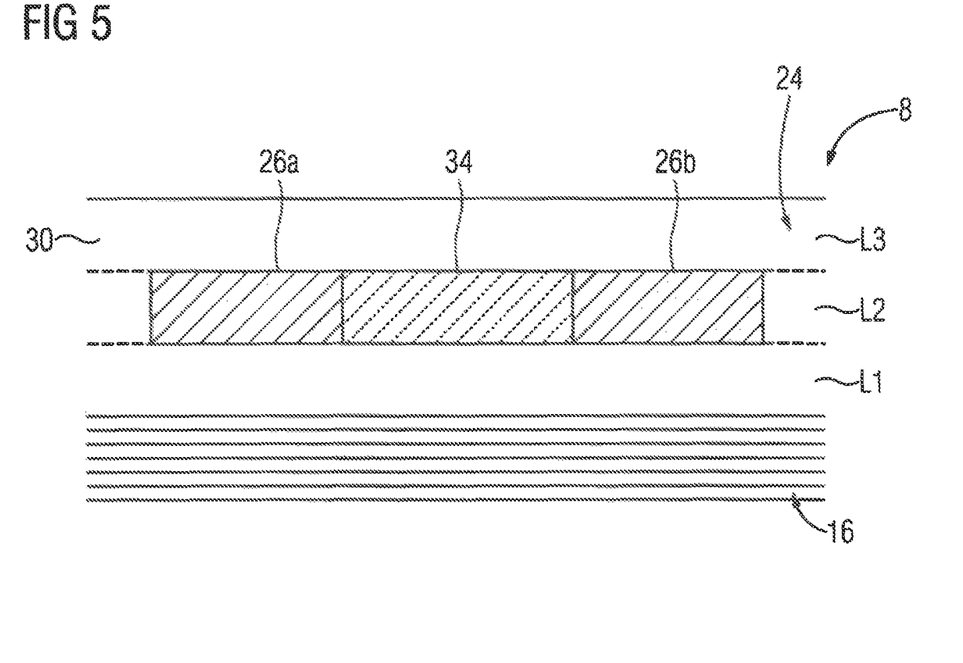
FIG. 5 shows an enlarged longitudinal section through a third embodiment of a stator of an electrical rotating machine in the region of the winding head board.

FIG. 5 shows an enlarged longitudinal section through a third embodiment of a stator 8 of an electrical rotating machine 2 in the region of the winding head board 24 which has three layers L1, L2, L3. By way of example, two conductor tracks 26*a*, 26*b* run in the central, second layer L2. A region comprising a third dielectric material 34, which has a higher dielectric strength than the first dielectric material 30, is likewise located in the second layer between the two conductor tracks 26*a*, 26*b*. In particular, the third dielectric material 34 is embodied as a ceramic material. As an alternative, the third dielectric material 34 is embodied as a plastic with a high dielectric strength. Owing to the increased dielectric strength in the region between the two conductor tracks 26*a*, 26*b*, it is possible to reduce the distance between the conductor tracks. The further design of the stator 8 corresponds to the design in FIG. 2.

Figure 6:
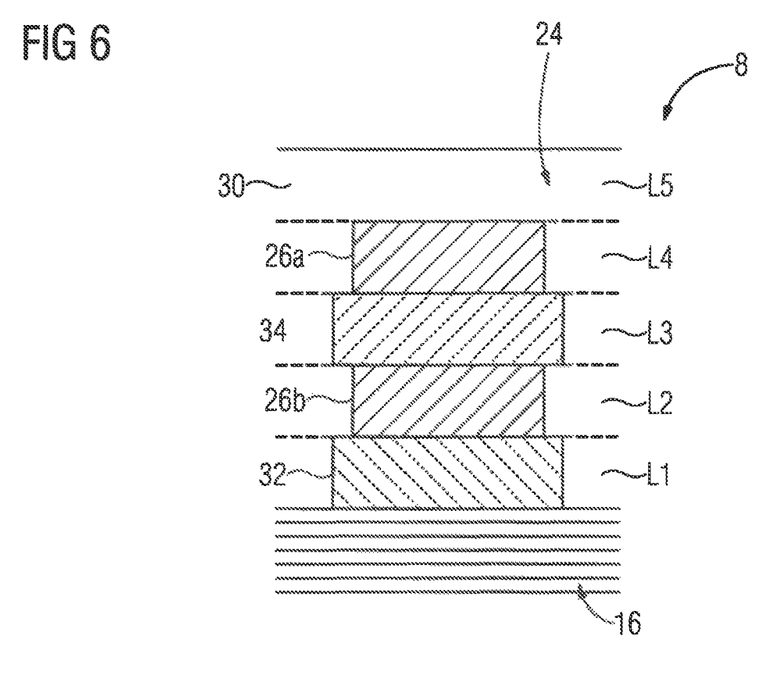
FIG. 6 shows an enlarged longitudinal section through a fourth embodiment of a stator of an electrical rotating machine in the region of the winding head board.

FIG. 6 shows an enlarged longitudinal section through a fourth embodiment of a stator 8 of an electrical rotating machine 2 in the region of the winding head board 24 which, as in FIG. 2, has five layers L1, L2, L3, L4, L5. A respective conductor track 26*a*, 26*b* is arranged in the second layer L2 and in the fourth layer L4. In particular, the first conductor track 26*a* is located immediately above the second conductor track 26*b*. As in FIG. 2, a continuous region comprising a second dielectric material 32 is arranged in the first layer L1, wherein the second dielectric material 32, which has a higher thermal conductivity than the first dielectric material 30, establishes a thermal connection between the second conductor track 26*b* and the stator laminated core 16.

Furthermore, a further continuous region comprising a third dielectric material 34 is arranged in the third layer L3 between the first conductor track 26*a* and the second conductor track 26*b*. The third dielectric material 34 has a higher dielectric strength than the first dielectric material 30. In particular, the third dielectric material 34 is embodied as a ceramic material. As an alternative, the third dielectric material 34 is embodied as a plastic with a high dielectric strength. Owing to the increased dielectric strength in the region between the two conductor tracks 26*a*, 26*b*, it is possible to reduce the thickness of the third layer L3. The further design of the stator 8 corresponds to the design in FIG. 2.

Figure 7:
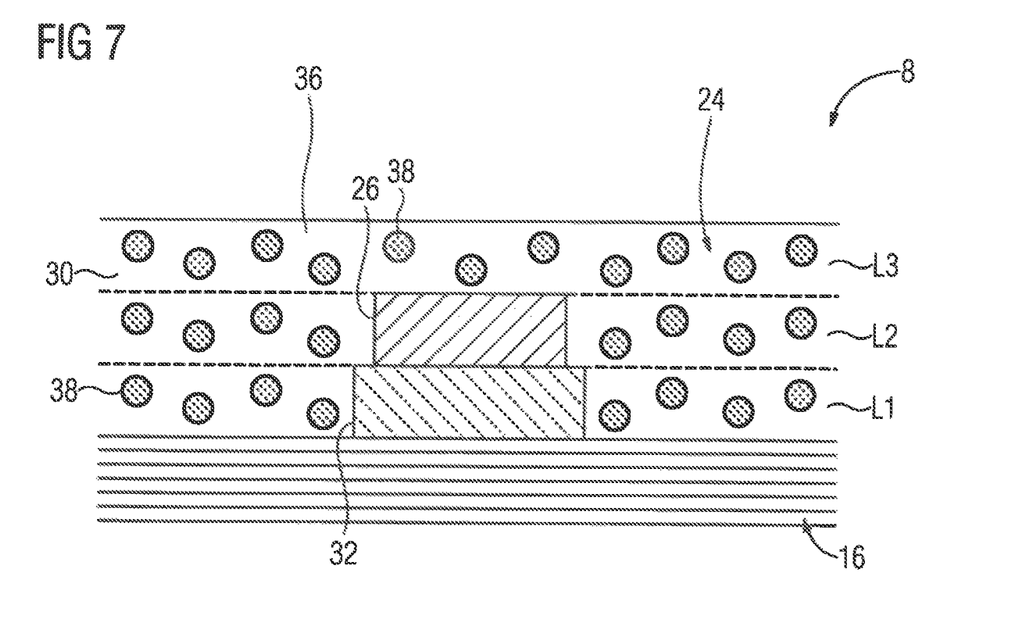
FIG. 7 shows an enlarged longitudinal section through a fifth embodiment of a stator of an electrical rotating machine in the region of the winding head board.

FIG. 7 shows an enlarged longitudinal section through a fifth embodiment of a stator 8 of an electrical rotating machine 2 in the region of the winding head board 24 which has, by way of example, three layers L1, L2, L3. The layers L1, L2, L3 of the winding head board 24 are produced for the most part from a first dielectric material 30 which is embodied as a ceramic material and contains a first plastic 36 which is admixed with a first ceramic powder 38, for example aluminum oxide. In particular, the first dielectric material 30 of the insulating main body can be easily and efficiently produced by means of an additive manufacturing process from the first plastic 36 which is admixed with the first ceramic powder 38.

In order to improve the thermal connection of the conductor track 26 to the stator laminated core 16 and therefore the heat dissipation, the conductor track 26 is thermally connected to the stator laminated core 16 in the first layer L1 by means of a continuous region comprising a second dielectric material 32. The second dielectric material 32 is likewise embodied as a ceramic material and contains, for example, aluminum nitride. Furthermore, the second dielectric material 32 has a higher thermal conductivity than the first ceramic powder 38 of the first dielectric material 32. At least one of the dielectric materials of the stator 8 in FIG. 7 is arranged with the aid of an additive manufacturing process. The further design of the stator 8 corresponds to the design in FIG. 2.

Figure 8:
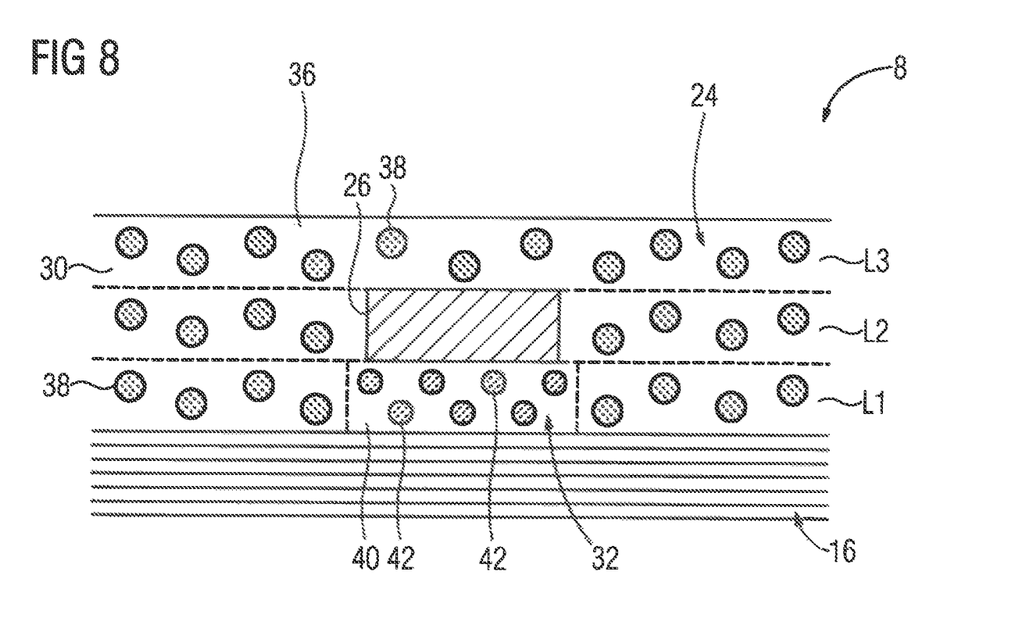
FIG. 8 shows an enlarged longitudinal section through a sixth embodiment of a stator of an electrical rotating machine in the region of the winding head board.

FIG. 8 shows an enlarged longitudinal section through a sixth embodiment of a stator 8 of an electrical rotating machine 2 in the region of the winding head board 24. The region comprising the second dielectric material 32 thermally connects the conductor track 26 to the stator laminated core 16 in the first layer L1. The second dielectric material 32 is embodied as a second plastic 40 comprising a second ceramic powder 42. As an alternative, the first plastic 36 is identical to the second plastic 40 and the first ceramic material 30 and the second ceramic material 32 differ only by virtue of the ceramic powder 38, 42 which is mixed with the plastic 36, 40. Since, at least on account of the second ceramic powder 42, the second dielectric material 32 has a higher thermal conductivity than the first ceramic material 30 comprising the first ceramic powder 40, the removal of heat from the conductor track through which current flows is improved. The further design of the stator 8 corresponds to the design in FIG. 7.

Figure 9:
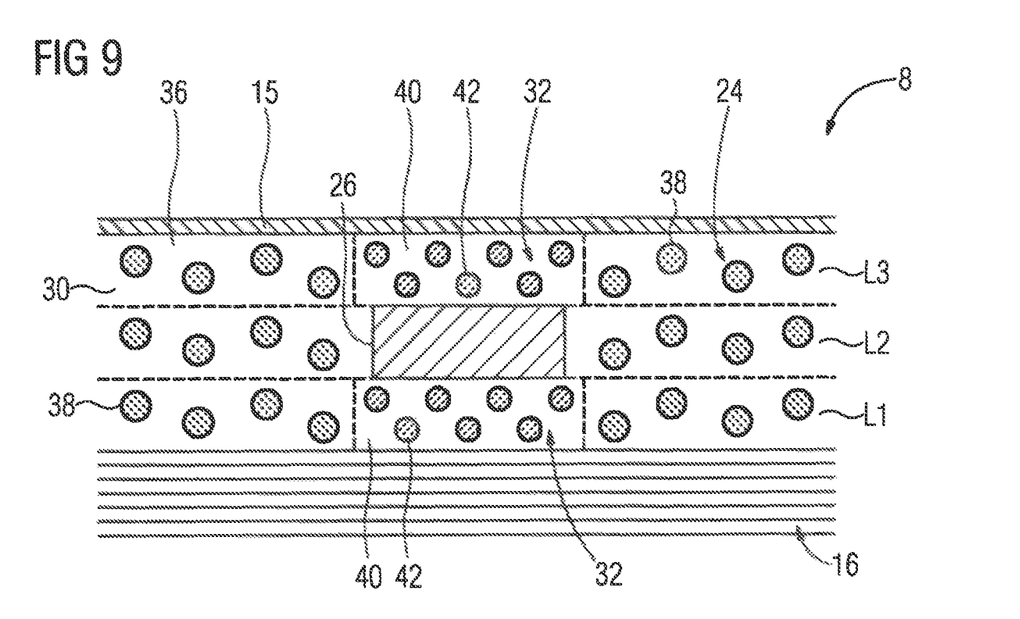
FIG. 9 shows an enlarged longitudinal section through a seventh embodiment of a stator of an electrical rotating machine in the region of the winding head board.

FIG. 9 shows an enlarged longitudinal section through a seventh embodiment of a stator 8 of an electrical rotating machine 2 in the region of the winding head board 24. A machine housing 15 rests on the winding head board 24, wherein a further region comprising the second dielectric material 32 is arranged in the third layer L3, so that heat is additionally removed from the conductor track 26 by means of the machine housing 15. The further design of the stator 8 corresponds to the design in FIG. 7.

Figure 10:
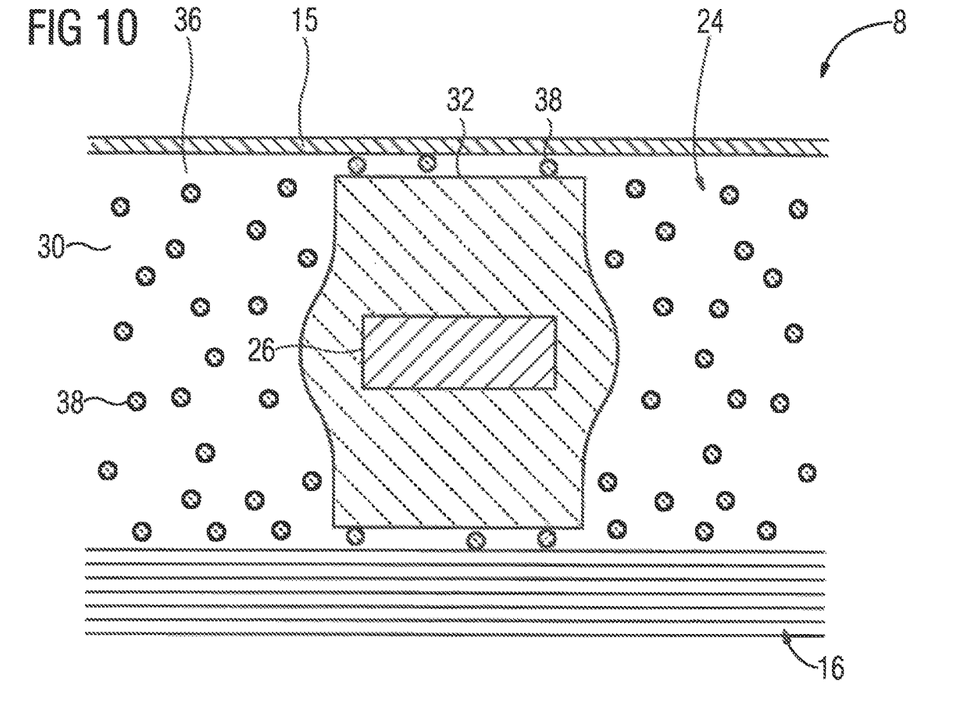
FIG. 10 shows an enlarged longitudinal section through an eighth embodiment of a stator of an electrical rotating machine in the region of the winding head board.

FIG. 10 shows an enlarged longitudinal section through an eighth embodiment of a stator 8 of an electrical rotating machine 2 in the region of the winding head board 24. The winding head board 24, which rests on the stator laminated core 16, is produced using an additive manufacturing process, without a layer construction comprising two dielectric materials 30, 32.

The first dielectric material 30 is embodied as a ceramic material and contains a first plastic 36 which is admixed with a first ceramic powder 38. The machine housing 15 of the electrical rotating machine 2 rests on the winding head board 24. A conductor track 26 is arranged in the winding head board 24. A region comprising a second dielectric material 32, which is embodied as a ceramic material, for example aluminum nitride, and has a higher thermal conductivity than the first dielectric material 30, is arranged around the conductor track 26 between the stator laminated core 16 and the machine housing 15 such that heat is transmitted from the conductor track 26 to the stator laminated core 16 and the machine housing 15 by means of the region comprising the second dielectric material 32. The shape and arrangement of the region comprising the second dielectric material 32 is optimized in respect of efficient heat transfer and high mechanical stability. In particular, in order to ensure high mechanical stability, the region comprising the second dielectric material 32 is completely surrounded by the first dielectric material 30 and in this way integrated into the insulating main body. The insulating main body terminates seamlessly to the outside. The further design of the stator 8 corresponds to the design in FIG. 7.

Figure 11:
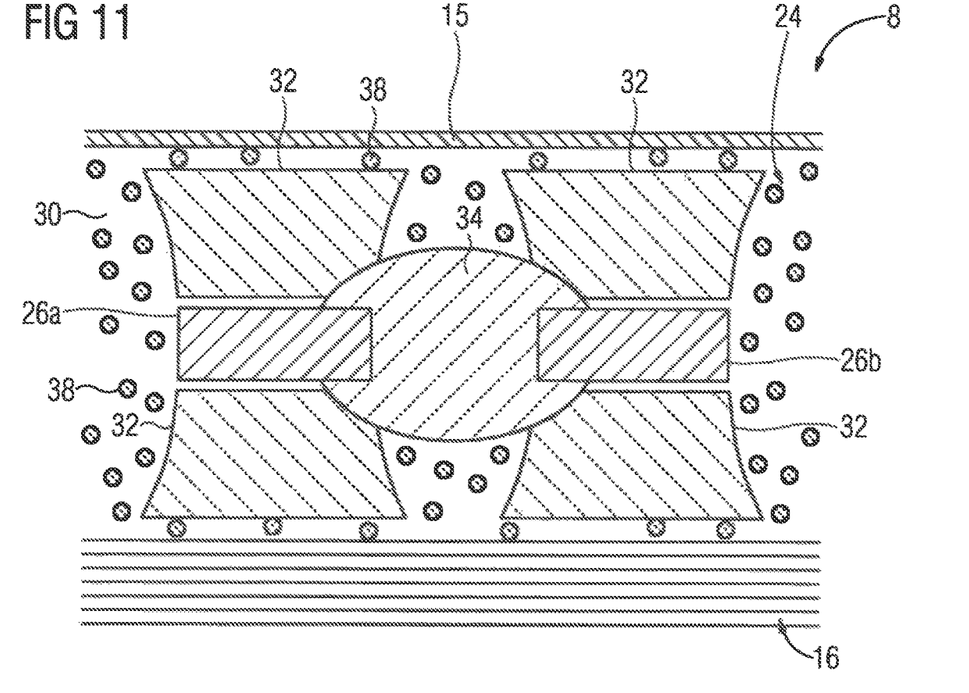
FIG. 11 shows an enlarged longitudinal section through a ninth embodiment of a stator of an electrical rotating machine in the region of the winding head board.

FIG. 11 shows an enlarged longitudinal section through a ninth embodiment of a stator 8 of an electrical rotating machine 2 in the region of the winding head board 24. As in FIG. 10, the winding head board 24 is produced using an additive manufacturing process, without a layer construction, and has three different dielectric materials 30, 32, 34. By way of example, two conductor tracks 26a, 26b run in the winding head board 24. On each of the two conductor tracks 26a, 26b, a region comprising the second dielectric material 32, which is embodied as ceramic material, for example aluminum nitride, and has a higher thermal conductivity than the first dielectric material 30, is arranged between the stator laminated core 16 and the machine housing 15 such that heat is transferred from the respective conductor track 26a, 26b to the stator laminated core 16 and the machine housing 15 by means of the second dielectric material 32. Here, the region comprising the second dielectric material 32 is completely surrounded by the region comprising the first dielectric material 30 and in this way integrated into the insulating main body in order to ensure high mechanical stability. As an alternative, the second dielectric material 32 is embodied as plastic 40 comprising a ceramic powder 42.

In addition, a region comprising the third dielectric material 34, which has a higher dielectric strength than the first dielectric material 30 and the second dielectric material 32, is located between the conductor tracks 26a, 26b. The third dielectric material 34 is embodied as a ceramic material or as a plastic with a high dielectric strength. The arrangement of the region comprising the third dielectric material 34 is optimized in respect of the field distribution between the conductor tracks 26a, 26b. The further design of the stator 8 corresponds to the design in FIG. 10.

In summary, the invention relates to a stator 8 for an electrical rotating machine 2. In order to achieve a smaller axial length in comparison to the prior art, the invention proposes that the stator laminated core 16 with coil bars 20 has at least one winding head board 24, wherein the at least one winding head board 24 rests on an end side 23 of the stator laminated core 16, wherein the winding head board 24 has a main body comprising a first dielectric material 30, wherein conductor tracks 26, 26a, 26b, which are connected to the coil bars 20, are integrated into the winding head board 24, wherein the winding head board 24 has a region comprising a second dielectric material 32 and/or a region comprising a third dielectric material 34, wherein the second dielectric material 32 has a higher thermal conductivity than the first dielectric material 30 of the main body 28, wherein the region comprising the second dielectric material 32 is arranged between at least one conductor track 26, 26a, 26b and the stator laminated core 16 in such a way that heat can be transmitted between the at least one conductor track 26, 26a, 26b and the stator laminated core 16 by means of the second dielectric material 32, wherein the third dielectric material 34 has a higher dielectric strength than the first dielectric material 30, wherein the region comprising the third dielectric material 34 is arranged between at least two conductor tracks 26, 26a, 26b.

What is claimed is:

1. A stator for an electrical rotating machine, said stator comprising:
    a stator laminated core including coil bars and a winding head board which rests on an end side of the stator laminated core and rests on a machine housing of the electrical, rotating maching, said winding head board including a main body with a first dielectric material; and
    conductor tracks connected to the coil bars and integrated into the winding head board,
    wherein the winding head board includes a first region having a second dielectric material with a thermal conductivity which is higher than a thermal conductivity of the first dielectric material of the main body, and/or a second region arranged between at least two of the conductor trasks and having a third dielectric material with a dielectric strength which is higher than a dielectric strength of the first dielectric material,
    wherein the first dielectric material has a mechanical strength which is higher than a mechanical strength of the second dielectric material and a mechanical strength of the third dielectric material,
    wherein the first region is arranged between at least one of the conductor tracks and the stator laminated core in such a way that heat is transmittable between the at least one of the conductor tracks and the stator laminated core via the second dielectric material, and
    wherein the first region is arranged between at least one of the conductor tracks the machine housing of the electrical rotating machine in such a way that heat is transmittable between the at least one of the conductor tracks and the machine housing via the second dielectric material.

2. The stator of claim 1, wherein the winding head board is produced at least partially using an additive manufacturing process.

3. The stator of claim 1, wherein at least one of the first, second and third dielectric materials is in the form of a ceramic material.

4. The stator of claim 1, wherein at least one of the second and third dielectric materials contains aluminum nitride and/or beryllium oxide.

5. The stator of claim 1, wherein the first dielectric material contains aluminum oxide.

6. The stator of claim 1, wherein at least one of the first, second and third dielectric materials contains a plastic with ceramic powder.

7. The stator of claim 1, wherein the winding head board includes at least two layers.

8. The stator of claim 7, wherein at least two of the first, second and third dielectric materials are arranged in at least one of the two layers of the winding head board.

9. An electrical rotating machine, comprising:
    a machine housing; and
    a stator comprising, a stator laminated core including coil bars and a winding head board which rests on an end side of the stator laminated core and rests on the machine housing, said winding head board including a main body with a first dielectric material, and conductor tracks connected to the coil bars and integrated into the winding head board, wherein the winding head board includes a first region having a second dielectric material with a thermal conductivity which is higher than a thermal conductivity of the first dielectric material of the main body, and/or a second region arranged between at least two of the conductor tracks and having a third dielectric material with a dielectric strength which is higher than a dielectric strength of the first dielectric material, wherein the first dielectric material has a mechanical strength which is higher than a mechanical strength of the second dielectric material and a mechanical strength of the third dielectric material, wherein the first region is arranged between at least one of the conductor tracks and the stator laminated core in such a way that heat is transmittable between the at least one of the conductor tracks and the stator laminated core via the second dielectric material, and wherein the first region is arranged between at least one of the conductor tracks and the machine housing in such a way that heat is transmittable between the at least one of the conductor tracks and the machine housing via the second dielectric material.

10. The electrical rotating machine of claim 9, wherein the winding head board is produced at least partially using an additive manufacturing process.

11. The electrical rotating machine of claim 9, wherein at least one of the first, second and third dielectric materials is in the form of a ceramic material.

12. The electrical rotating machine of claim 9, wherein at least one of the second and third dielectric materials contains aluminum nitride and/or beryllium oxide.

13. The electrical rotating machine of claim 9, wherein the first dielectric material contains aluminum oxide.

14. The electrical rotating machine of claim 9, wherein at least one of the first, second and third dielectric materials contains a plastic with ceramic powder.

15. The electrical rotating machine of claim 9, wherein the winding head board includes at least two layers.

16. The electrical rotating machine of claim 15, wherein at least two of the first, second and third dielectric materials are arranged in at least one of the two layers of the winding head board.

* * * * *

UNITED STATES PATENT AND TRADEMARK OFFICE
CERTIFICATE OF CORRECTION

Page 1 of 1

PATENT NO. : 11,165,310 B2
APPLICATION NO. : 16/487378
DATED : November 2, 2021
INVENTOR(S) : Sewiolo It is certified that error appears in the above-identified patent and that said Letters Patent is hereby corrected as shown below:

On the Title Page

Item (30) Foreign Application Priority Data:
Replace "EP 17157172" with the correct --EP 17157172.2--.

Item (56) FOREIGN PATENT DOCUMENTS:
Correct the publication date of "SU 132307 A1 11/1980" to read --11/1960--.

In the Claims

In Column 10, Line 17, Claim 1:
Replace "conductor tracks the machine" with --conductor tracks and the machine--.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*